United States Patent [19]

Sakimori et al.

[11] Patent Number: 4,790,709

[45] Date of Patent: Dec. 13, 1988

[54] ARTICLE PICKING UP MECHANISM

[75] Inventors: Hideharu Sakimori; Hiroyuki Hayashi, both of Hiroshima; Daijiro Ida, Narashino; Seiji Takahashi, Sakura, all of Japan

[73] Assignee: Mazda Motor Corporation, Hiroshima, Japan

[21] Appl. No.: 78,787

[22] Filed: Jul. 28, 1987

[30] Foreign Application Priority Data

Jul. 30, 1986 [JP] Japan .................................. 61-180871

[51] Int. Cl.⁴ .............................................. B65G 65/02
[52] U.S. Cl. ...................................... 414/416; 29/759; 294/93; 901/7; 414/225; 414/741
[58] Field of Search ................. 414/416, 403, 38, 120, 414/222, 225, 28, 330, 736, 741; 901/7, 31, 47; 29/759; 198/345, 346.1, 434, 456, 953; 53/544; 294/93

[56] References Cited

U.S. PATENT DOCUMENTS

| 4,527,326 | 7/1985 | Kohno et al. | 901/47 X |
| 4,630,344 | 12/1986 | Boyle et al. | 294/93 X |

FOREIGN PATENT DOCUMENTS 56-39840 4/1981 Japan .
2158815 11/1985 United Kingdom ................ 198/953

Primary Examiner—Robert J. Spar
Assistant Examiner—Stuart J. Millman
Attorney, Agent, or Firm—Fleit, Jacobson, Cohn & Price

[57] ABSTRACT

An article picking up mechanism for picking up articles placed in a container one by one for assembling the articles on works. The mechanism includes a tiltable table for receiving the container and tilting it to thereby shift the articles to one side of the container leaving a space in the other side. A manipulator robot is provided to shift one of the articles toward the space and grip the article to take out of the container.

12 Claims, 8 Drawing Sheets

ARTICLE PICKING UP MECHANISM

BACKGROUND OF THE INVENTION

1. Field of the Invention

The present invention relates to an article picking up mechanism adapted for use for example in an assembling apparatus. More specifically, the present invention pertains to an article picking up mechanism which may be applied to an automated assembling apparatus in which articles to be assembled are picked up by a manipulator and placed on works on which the articles are to be assembled.

2. Description of the Prior Art

In assembling lines in a manufacturing plant, such as an automobile manufacturing plant, the assembling processes for assembling articles or parts are automated by using assembling robots. For making the automated assembling processes work well, it is important to set up a procedure for supplying the articles or parts to the robots. The Japanese patent application No. 54-115656 filed on Sept. 11, 1979 and disclosed on Apr. 15, 1981 under the disclosure No. 56-39840 discloses a part supply system which can be used for such assembling line. The system disclosed by the Japanese patent application includes a vibrating part feeder which functions to supply the parts to be assembled one by one to a locating section where the part is picked up by a robot.

The part supply system as disclosed by the Japanese patent application is however disadvantageous in that the mechanism for the system is complicated and requires a space. In view of the problem, it may very often be advisable to supply the parts in a container and have the parts picked up by a robot directly from the container. It should however be noted that when a parts is picked up by a manipulator such as a robot hand from a group of parts which are located in regular positions in the container the part which is being picked up may hit the other parts which are adjacent to the part being picked up so that such adjacent parts may fall down in the container possibly disturbing succeeding picking up operation.

SUMMARY OF THE INVENTION

It is an object of the present invention to provide an article picking up mechanism which can eliminate the aforementioned problems in conventional part picking up mechanisms.

Another object of the present invention is to provide an article picking up mechanism which is simple in structure but can pick up a part from a group of parts in a container without affecting the position and orientation of the other parts in the container.

According to the present invention, the above and other objects can be accomplished an article picking up mechanism for picking up articles one by one from container in which the articles are placed, said mechanism including tiltable base means for receiving the container and tilting the container so that the articles in the container are shifted to one side of the container leaving a space at the other side, manipulator means for shifting one article in the container to a position where it does not contact with the other articles in the container and picking up said one article from the container.

According to the features of the present invention, the articles in the container are shifted to one side of the container to form a space at the other side. The article to be picked up is at first shifted to the space thus formed and then gripped by the manipulator means. Since the article to be picked up is placed apart from the other articles at this moment, the picking up operation does not make the article to be picked up contact with the other article in the container. Thus, there will no danger of the other articles being caused to fall down by being hit by the article which is being picked up.

It will be noted that the tilting operation may not be necessary each time the article is picked up by it may be carried out only in the beginning of picking up the first article in the container. In picking up the second and subsequent articles, the space is already provided in the container so that shifting and picking up of the article to be picked up can be made without a further tilting operation of the container.

The above and other objects and features of the present invention will become apparent from the following descriptions of a preferred embodiment taking reference to the accompanying drawings.

DESCRIPTION OF THE PREFERRED EMBODIMENT

Figure 1:
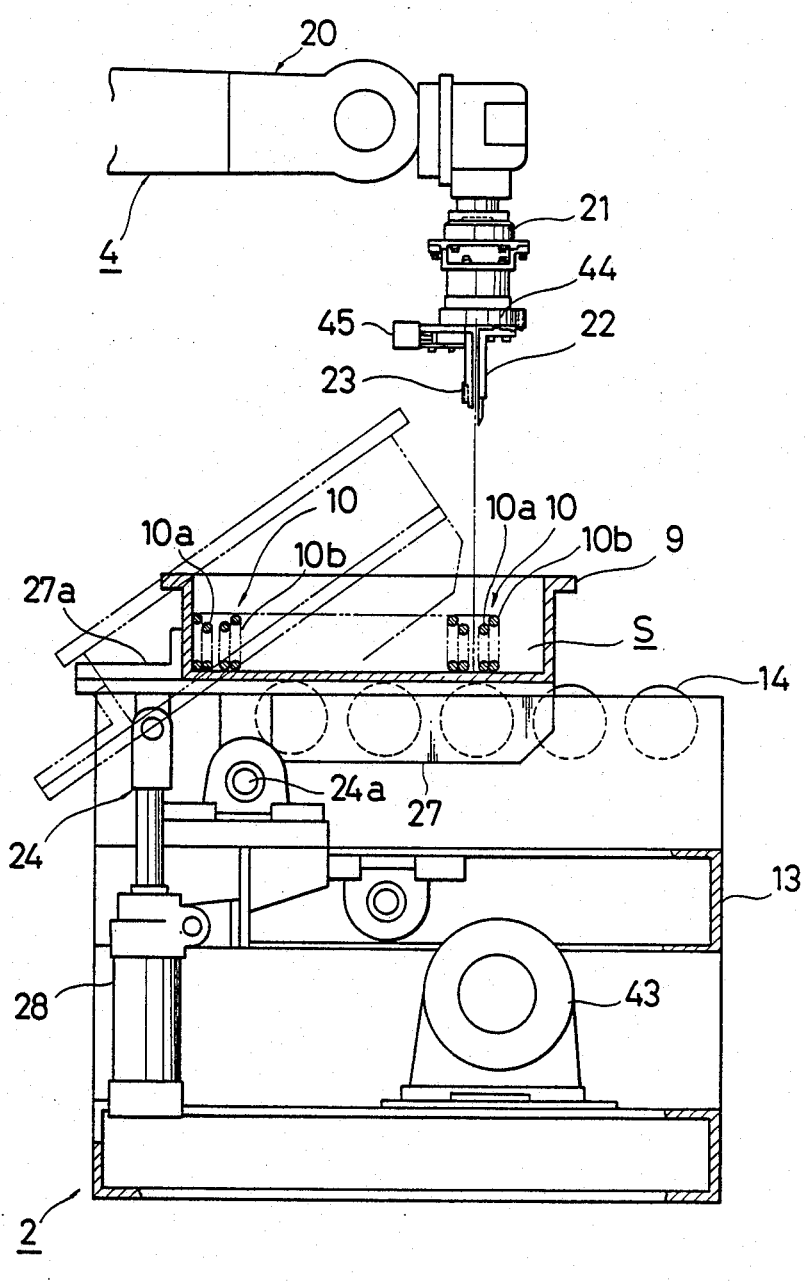
FIG. 1 is an article picking up apparatus in accordance with one embodiment of the present invention.
Figure 5:
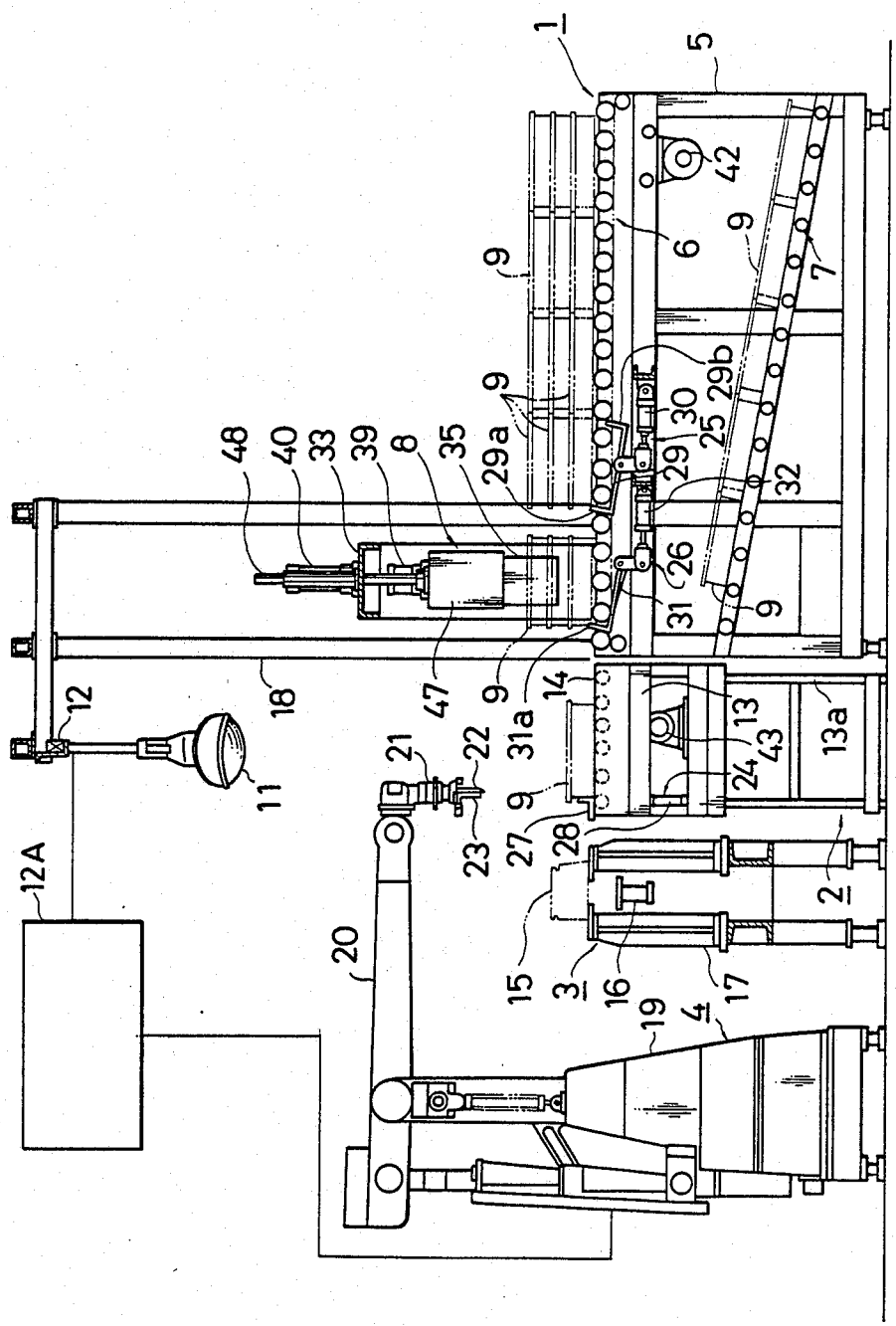
FIG. 5 is an overall side view of the article picking up apparatus.
Figure 6:
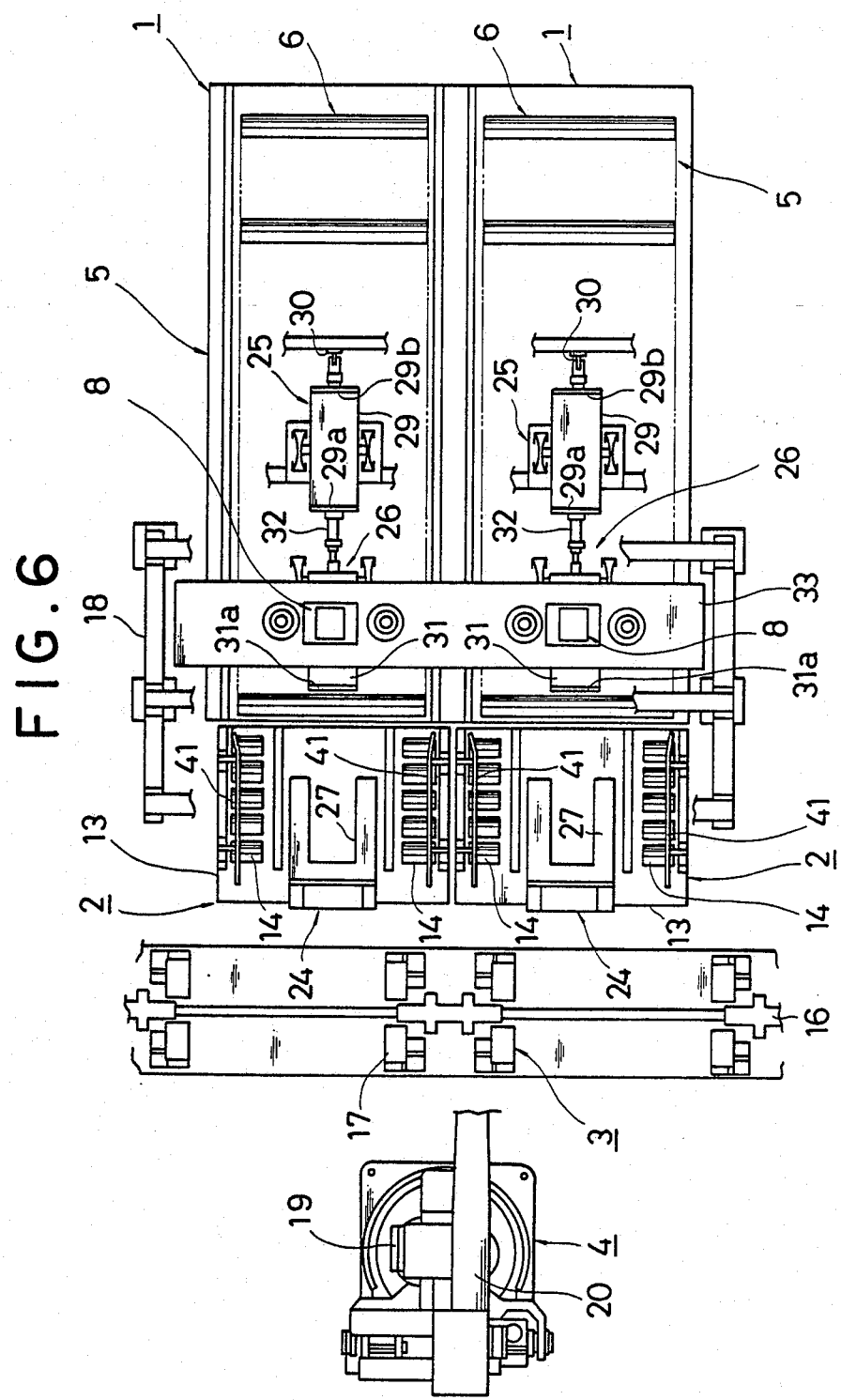
FIG. 6 is a top plan view of the apparatus.
Figure 7:
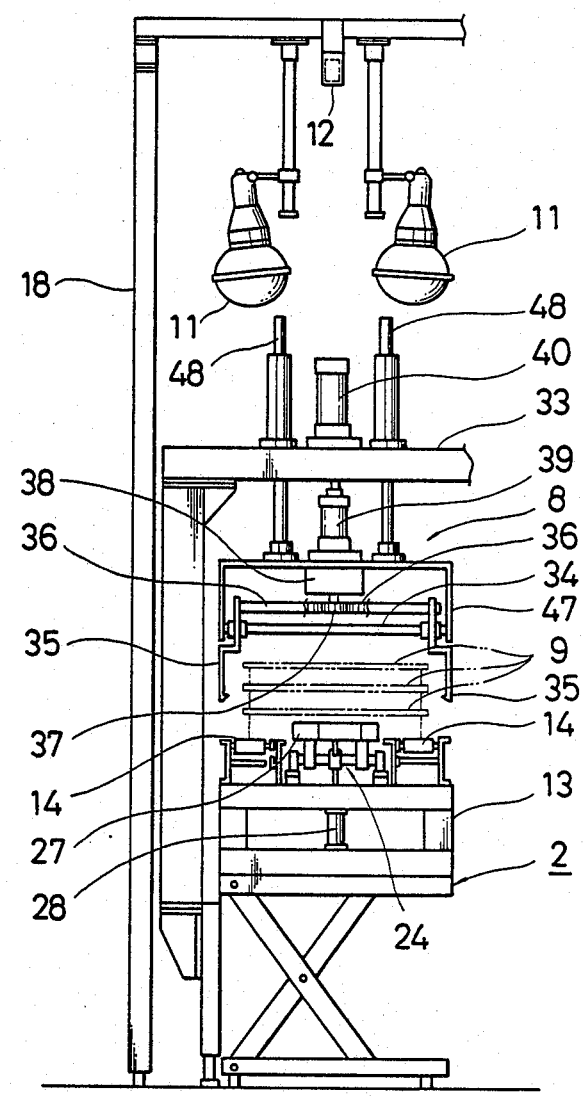
FIG. 7 is a front view of the apparatus.
Figure 9:
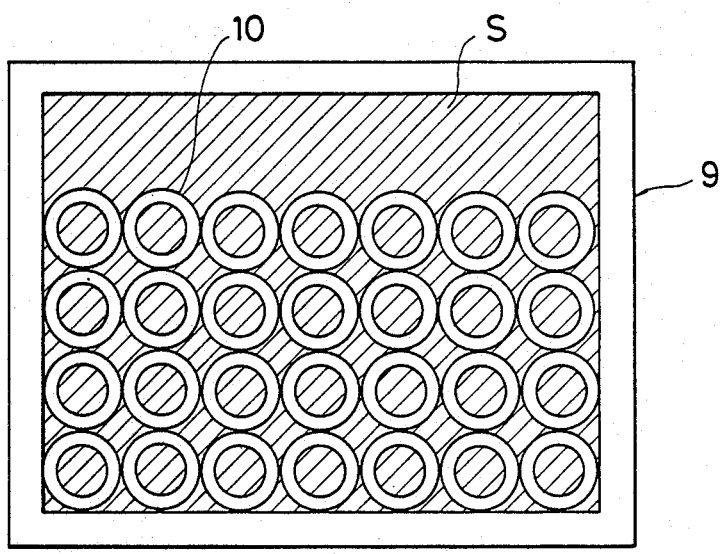

Referring now to the drawings, particularly to FIGS. 5 through 7, there is shown an article picking up apparatus embodying the features of the present invention. The apparatus includes a pair of parallelly arranged conveyor assemblies 1 on which containers 9 are to be transported. As shown in FIGS. 1 and 9, a plurality of articles 10 are in the container 9. Adjacent to one end of each conveyor assembly 1, there is a container locating mechanism 2 for locating the container 9 at a position where the articles 10 are picked up one by one from container 9.

Adjacent to the locating mechanisms 2, there is provided an assembling station 3 where the articles 10 are assembled on works 15. In the illustrated embodiment, the article 10 to be picked up is a valve spring which is adapted to be assembled on a cylinder head of an internal combustion engine. Thus, it will be understood that the work 15 in this embodiment is a cylinder head. There is further provided a manipulator which is in the form of an assembling robot 4 for picking up the articles 10 in the container 9 and assembling the picked up article on the work 15.

The conveyor assembly 1 includes a stationary base frame 5 and a conveyor 6 provided at the upper portion of the base frame 5. The conveyor 6 may be a roller conveyor comprising a plurality of rollers as shown.

The containers 9 having the articles 10 arranged therein are conveyed on the roller conveyor 6. In the embodiment which is being described, the containers 9 are conveyed in stacks of three containers as shown in FIG. 5. At the end of the conveyor 6 adjacent to the locating mechanism 2, there is a lifter 8 for lifting upper containers 9 in the container stack so that the lowest container can be separated from the other containers in the stack and transported to the next work station.

The conveyor 6 is provided with a first stopper mechanism 25 which is located in front of the lifter 8. The stopper mechanism 25 includes a swingable member 29 having a front claw 29a at one end and a rear claw 29b at the other end. An air cylinder 30 is provided for actuating the swingable member 29 between a first position where the front claw 29a is raised and the rear claw 29b is lowered and a second position where the front claw 29a is lowered and the rear claw is raised. The front claw 29a is positioned adjacent to the lifter 8 and engages in the first position with the stack of the containers 9 at the front end thereof to prevent the stack from being transferred to the lifter 8. In the second position, the front claw 29a of the swingable member 29 is lowered so that the stack of the containers 9 which is adjacent to the lifter 8 is released from the first stopper mechanism 25. In this position, the rear claw 29b is engaged with the front end of the stack of the containers 9 which is next to the stack adjacent to the lifter 8. Thus, only one of the container stack is allowed to be proceeded to the lifter 8.

In the lifter 8, there is provided a second stopper mechanism 26 which includes a swingable member 31 having a claw 31a located at an end adjacent to the locating mechanism 2. The second stopper mechanism 26 further includes an air cylinder 32 for moving the swingable member 31 between a raised position where the claw 31a is lowered. In the raised position, the claw 31a is engaged with the front end of the container stack which is in the lifter 8 to hold the stack in the lifter 8.

The lifter 8 includes an upright frame 33 which has vertical guide rods 48 carrying a support frame 47 at the lower ends. As shown in FIG. 7, the frame 47 is provided with horizontally extending guide bars 34 which slidably carries a pair of gripping arms 35. The gripping arms 35 are respectively provided with rack bars 36 which are parallel with each other and engaged with a pinion 37 so that the arms 35 are moved to and from each other in response to a rotation of the pinion 37. The pinion 37 is connected with a rotary actuator 38 which is adapted to be actuated by an air cylinder 39. An air cylinder 40 is provided on the frame 33 for driving the frame 47 in the vertical direction.

In operation of the mechanism as described, the air cylinder 40 is actuated to move the frame 47 to a position where the gripping arms 35 are positioned at a height corresponding to the container 9 which is at the second from the bottom of the container stack in the lifter 8. Then, the air cylinder 39 is operated to actuate the rotary actuator 38 to thereby rotate the pinion 37 in the direction of moving the arms 35 toward each other. Thus, the second container 9 from the bottom of the container stack is gripped by the arms 35 and the air cylinder 40 is operated again to lift the frame 47. In this manner, the bottom container 9 in the stack which is in the lifter 8 is separated from the other containers 9 in the stack. Then, the air cylinder 26 is operated to lower the claw 31a of the swingable member 31 to release the bottom container in the lifter 8. After the bottom container 9 is moved to the locating mechanism 2, the air cylinder 40 is operated to lower the frame 47 so that the stack of the containers 9 are placed on the conveyor 6 in the lifter 8.

The locating mechanism 2 includes a table 13 which is provided for vertical movements on a base 13a as shown in FIG. 5. Roller conveyors 14 each comprising a plurality of rollers are provided on the upper surface of the table 13 at the opposite sides thereof. The table 13 is movable in the vertical direction between an upper position where the roller conveyor 14 on the table 13 is aligned with the conveyor 6 in the conveyor assembly 1 and a lower position where the roller conveyor 14 is lowered from the level of the conveyor 6. In FIG. 6, it will be noted that the table 13 is provided at the opposite sides with guide plates 41 for guiding the container from the lifter 8.

On the table 13, there is provided a tiltable mechanism 24 which includes a support fork 27 and an end stopper 27a which is attached to the support fork 27 at an end portion thereof. The support fork 27 is mounted on the table 13 for tilting movement about a shaft 24a as shown in FIG. 1. An air cylinder 28 is provided for tilting the fork 27 from the horizontal position to a tilted position shown by phantom lines in FIG. 1. The fork 27 is adapted to receive the container 9 from the conveyor 6 in the lifter 8. The container 9 on the fork 27 is positioned on the fork 27 by being engaged with the stopper 27a. When the container 9 is moved to the fork 27, the fork 27 is tilted as shown by the phantom lines in FIG. 1 so that the articles 10 in the container 9 is shifted to the side of the container 9 adjacent to the stopper 27a. Thus, a space S is formed in the container 9 at the other side. It will be noted in FIG. 1 that the article 10 in this embodiment is a dual type valve spring comprising an inner coil spring 10a and an outer coil spring 10b. As shown in FIG. 1, the inner coil spring 10a is of a smaller height whereas the outer coil spring 10b is of a larger height.

In FIG. 5, it will be noted that the frame 5 is provided at a lower portion with a return roller conveyor 7 which has an input end adjacent to the locating mechanism 2. The input end of the return conveyor 7 is at a heightwise position corresponding to that of the roller conveyor 14 on the table 13 at the lower position. After the articles 10 in the container 9 on the table 13 are all taken out, the table 13 is moved to the lower position and the vacant container 9 is transferred to the return conveyor 7 to be returned. The conveyors 6, 7 and 14 may be of any type. It is preferable that the conveyors 6 and 14 are of power driven type. For that purpose, driving motors 42 and 43 may be provided for driving the conveyors 6 and 14, respectively.

Above the locating mechanism 2, there are provided illuminating lamps 11 which are supported by an upright frame 18. A visual sensor 12 is also supported by the frame 18 for detecting the positions of the articles 10 in the container 9 which is in the locating mechanism 2. The visual sensor 12 functions to detect the positions of all of the articles 10 in the container 9 which is in the locating mechanism 2 by producing a visual image of the sight covering the whole area of the container 9. The sensor 12 is connected with a processing unit 12a which produces a position signal of the article to be picked up.

In the assembling station 3, there is provided a conveyor 16 which is of a carry-and-lift type and adapted for conveying the works 15 which are in this embodiment cylinder head on which the valve springs are mounted. There is further provided a positioning mechanism 17 which is adapted for positioning the work 15 for assembling the article 10 on the work 15.

Figure 2:
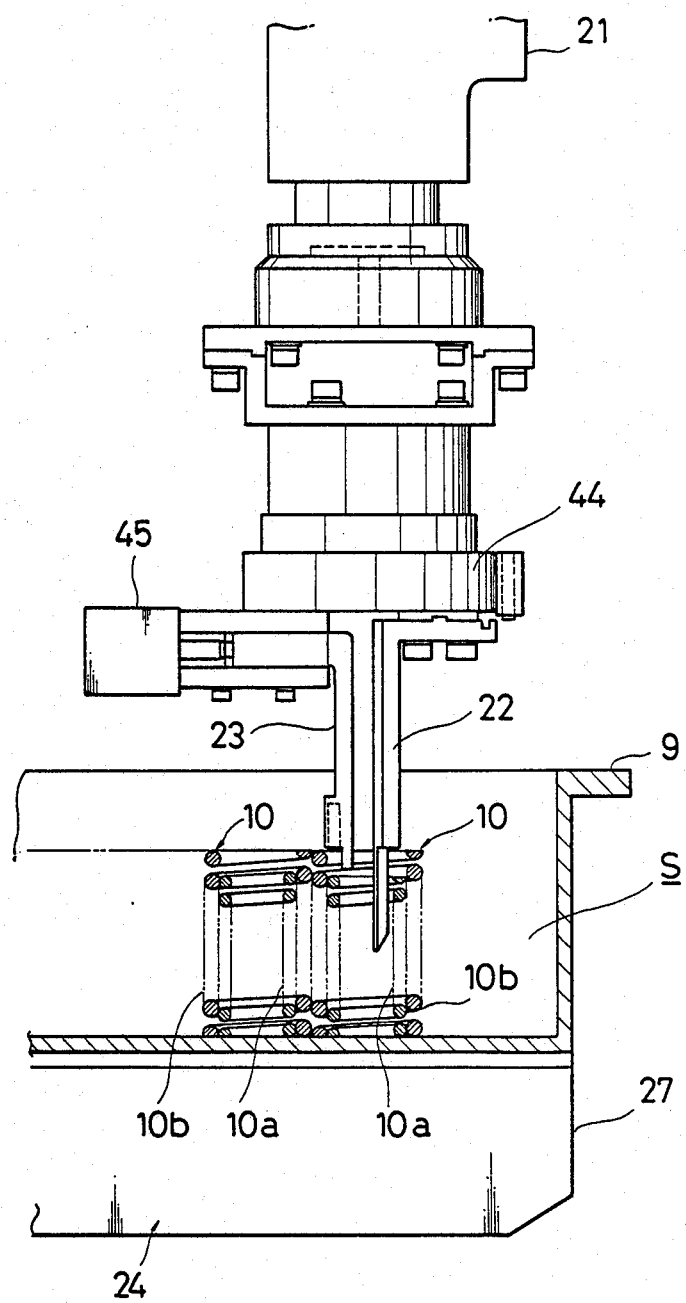
FIG. 2 is a front view of the apparatus shown in FIG. 1.
Figure 3:
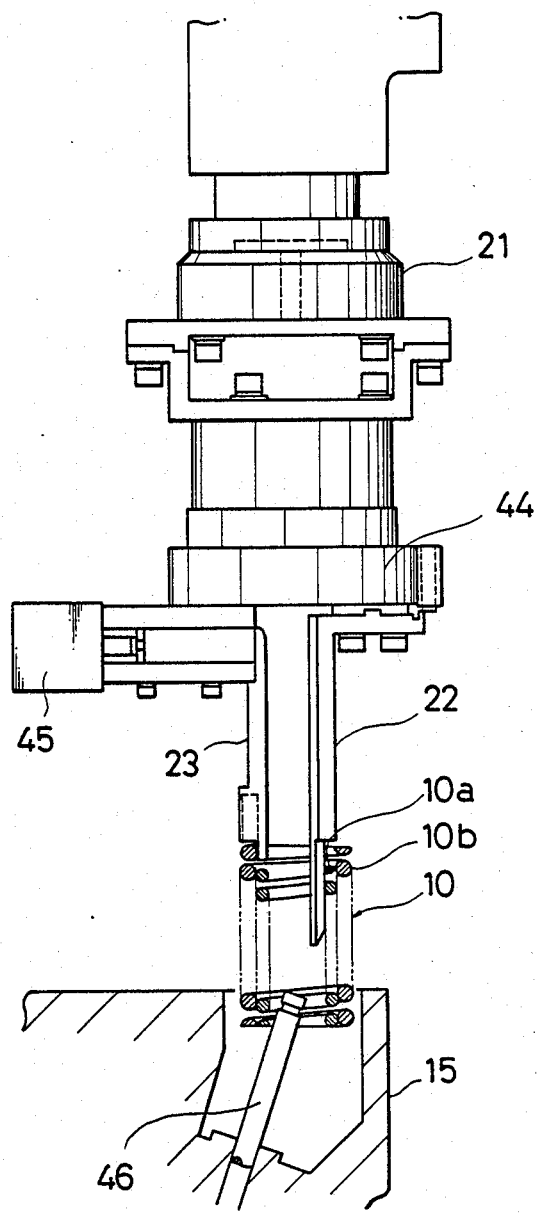
FIG. 3 is a front view of the manipulator in a position of positioning a valve spring on a cylinder head.
Figure 4:
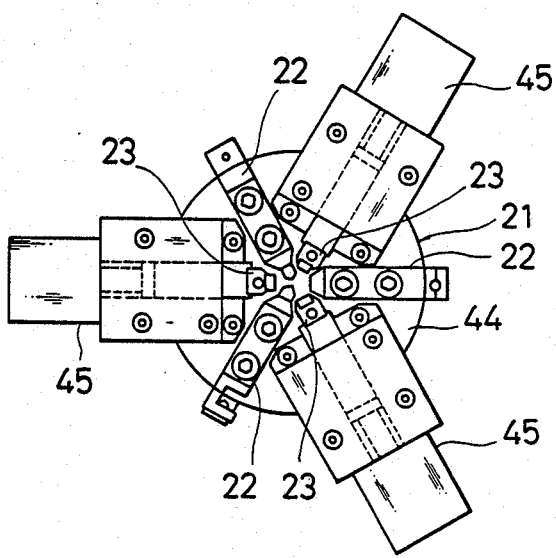
FIG. 4 is a bottom view of the manipulator hand.

The assembling robot 4 includes a robot body 19 and a robot arm 20 mounted on the upper end of the robot body 19 for required movements. The robot arm 20 is provided at the free end with a robot hand 21 which has inner fingers 22 and outer fingers 23 as shown in FIGS. 2 through 4. In FIG. 4, it will be noted that three inner fingers 22 are provided at angular positions which are spaced apart by 120 degrees. Similarly, three outer fingers 23 are provided between the angularly spaced inner fingers 22. Referring to FIG. 2, it will be noted that the inner fingers 22 are adapted to be inserted into the inside of the inner coil spring 10a of the valve spring 10 to grip the same. As shown in FIG. 3, the outer finger 23 are adapted to be inserted into the inside of the outer spring 10b to grip the top portion of the same. As previously mentioned, the outer spring 10b is larger in length than the inner spring 10a is, so that the top portion of the outer spring 10b projects upwards beyond the top end of the inner spring 10a. The outer fingers 23 are brought into engagement with the top portion of the outer spring 10b without having an interference with the top portion of the inner spring 10a.

The fingers 22 and 23 are mounted on the hand 21 for movements in the radial direction with respect to the hand 21. Actuators 44 and 45 are provided for driving the fingers 22 and 23, respectively, between radially inwardly retracted positions and radially outwardly expanded positions. For gripping the valve spring 10, the fingers 22 and 23 are placed in the radially retracted positions and the hand 21 is moved down so that the fingers 22 and 23 are inserted into the inner coil spring 10a and the outer coil spring 10b, respectively. Then, the actuators 44 and 45 are operated to move the fingers 22 and 23 to the radially expanded positions to thereby make the fingers 22 and 23 grip the inner and outer coil springs 10a and 10b, respectively. Thereafter, the hand 21 is moved upwards to pick up the valve spring 10 which is gripped by the fingers 22 and 23. The valve spring 10 thus picked up by the robot 4 is then placed on the cylinder head 15 which is positioned in the assembling station 3 as shown in FIG. 3. As shown in FIG. 6, the apparatus being described is provided with a pair of parallel lines each comprising the conveyor 6, the lifter 8 and the locating mechanism 2. In this embodiment, one of the parallel lines is adapted for mounting intake valve springs on the cylinder head whereas the other line is adapted for mounting outlet valve springs on the cylinder head.

Figure 8:
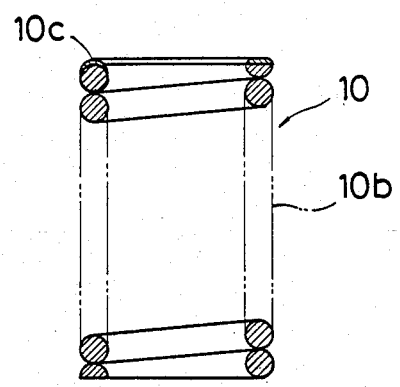
FIG. 8 is a side view of a valve spring which is to be picked up by the apparatus of the present invention; and, FIG. 9 is a top plan view of a container having valve springs arranged in the container.

According to the features of the present invention, the fork 27 in the locating mechanism 2 is tilted prior to the picking up operation so that the articles 10 in the container 9 are shifted to one side of the container 9 producing a space S in the other side of the container 9. Then, the fork 27 is returned to the horizontal position and the positions of the articles 10 in the container 9 are detected by the visual sensor 12. The visual sensor 12 may be a known type of image taking tube which produces signals corresponding to the image of the articles 10 in the container 9. In order that clear image signals can be obtained, each outer coil spring 10b is applied at the top end portion with a coating 10c of white paint as shown in FIG. 8. The processing unit 12a functions to convert the analogue image signals into binary signals to produce images of the articles 10 as shown in FIG. 9.

By scanning the images for example in the direction as shown in FIG. 9, the processing unit 12a detects the position of the article 10 which is to be picked up. It is preferable that the scanning is started at a corner of the container 9 where the space S is provided. The output of the processing unit 12a is applied to the robot 4 to control the operation of the robot 4.

In picking up the valve spring 10, the robot hand 21 is lowered as previously described until the robot fingers 22 and 23 are inserted respectively into the inner and outer coil springs 10a and 10b. Then, the robot hand 20 is operated to shift in the direction as shown by an arrow B in FIG. 9 the valve spring 10 which is to be picked up into the space S provided in the container 9. Thereafter, the actuators 44 and 45 are operated to make the fingers 22 and 23 grip the inner and outer coil springs 10a and 10b, respectively. The robot arm 20 is then operated to lift the hand 21 so that the article 10 gripped by the fingers 22 and 23 is taken out of the container 9. Once the space S is formed in the container in the initial stage of the picking up operation, it will no longer be necessary to have the fork 27 tilted before picking up further articles 10 in the same container 9.

With the article picking up operation as described, it is possible to prevent the article 10 which is being picked up from contacting or abutting the adjacent articles 10 possibly causing falling down of the adjacent articles. When all of the articles 10 are taken out from the container 9, the table 13 is lowered and the empty container 9 is transferred to the return conveyor 7.

The invention has thus been shown and described with reference to a specific embodiment, however, it should be noted that the invention is in no way limited to the details of the illustrated structures but changes and modifications may be made without departing from the scope of the appended claims.

We claim:

1. An article picking up mechanism for picking up articles one by one from a container in which the articles are located, said mechanism comprising tiltable base means for receiving the container and tilting the container so that the articles in the container are shifted to one side of the container leaving a space at the other side, and manipulator means for shifting an article in the container toward a location in said space where the relocated article does not contact any other article in the container, the manipulator means including gripping means for gripping said relocated article in the container, said gripping means including radially expansible finger means including inner fingers and outer fingers radially displaced outwardly of said inner fingers.

2. An article picking up mechanism in accordance with claim 1 further including detecting means for detecting an article in the container and producing a position signal indicative of same and means responsive thereto for actuating the manipulator means.

3. An article picking up mechanism according to claim 2 wherein said detecting means detects the positions of articles in said container and selects an article close to said space and produces a signal indicative thereof.

4. An article picking up mechanism according to claim 1 wherein the article to be picked up has a hollow structure, and the finger means are inserted into the article and radially expanded to grip the article within its hollow structure.

5. An article picking up mechanism according to claim 3 wherein the article is a spring member comprised of an outer coil spring and an inner coil spring received in the outer coil spring, the outer fingers pick up the outer coil spring and the inner fingers pick up the inner coil spring.

6. An article picking up mechanism for picking up one by one a plurality of coil members located in an open container, said coil members including an outer coil spring and an inner coil spring positioned within the outer coil spring with the top of the inner coil spring spaced below the top of the outer coil spring, the picking up mechanism comprising tiltable base means for receiving the container and tilting the container to shift the plurality of coil members to one side of the container leaving a free space on the opposite side, and manipulator means for one by one shifting the coil members into the free space and picking them up, said manipulator means including gripping means for picking up the articles, said gripping means including radially expansible finger means including inner fingers for gripping the inner coil spring and outer fingers radially displaced from the inner fingers for gripping the outer coil spring.

7. An article picking up mechanism according to claim 6 further including detecting means for detecting the positions of the articles in the container.

8. An article picking up mechanism according to claim 7 wherein said detecting means detects the position of an article close to the free space.

9. An article picking up mechanism according to claim 7 wherein said detecting means produces signals indicative of the positions of the articles in the container.

10. An article picking up mechanism according to claim 9 wherein the manipulator means is actuated responsive to the signals indicative of the positions of the articles in the container.

11. A method for picking up articles of an identical size and configuration one by one from a container having a flat bottom upon which the articles are placed, comprising the steps of tilting the container to shift the articles to one side of the container leaving a free space at the opposite side;

detecting the positions of the article in the container;

selecting one article in the container based on its position;

shifting said selected one article in the container to a position in the free space where said selected one article does not contact with the other articles in the container; and picking up said selected one article from the container.

12. Method according to claim 11 including the further step of returning the container to a horizontal position before detecting the positions of the articles.

* * * * *